United States Patent [19]
Litzkow et al.

[11] Patent Number: 5,646,404
[45] Date of Patent: Jul. 8, 1997

[54] ELECTRONIC GRAIN PROBE INSECT COUNTER (EGPIC)

[75] Inventors: Carl A. Litzkow, Newberry; Dennis Shuman, Gainesville, both of Fla.; Sergey Kruss, Norwood, Mass.; James A. Coffelt, Gainesville, Fla.

[73] Assignee: The United States of America as represented by the Secretary of Agriculture, Washington, D.C.

[21] Appl. No.: 390,834

[22] Filed: Feb. 17, 1995

[51] Int. Cl.$^6$ .................................................. G01N 21/00
[52] U.S. Cl. ...................... 250/338.1; 250/358.1
[58] Field of Search ............................. 250/338.1, 336.1, 250/340, 358.1, 341.1, 359.1

[56] References Cited

U.S. PATENT DOCUMENTS 4,410,967  10/1983  Hendricks ................................. 367/87
5,005,416   4/1991  Vick et al ................................. 75/587

OTHER PUBLICATIONS

Shuman et al., "An Electronic Fall-Through Probe Insect Counter Computer System for Monitoring Infestation in Stored Product Facilities", ASAE Meeting Presentation Paper No. 946501, Atlanta, Georgia (Dec. 13–16, 1994), pp. 1–12.

Hook et al., "Digital I/O with the PC", Dr. Dobbs Journal, Apr. 1994, pp. 64–70.

White et al., Journal of the Kansas Entomological Society 63(4):506–525 (1990) no month.

Reed et al., Journal Econ. Entomol. 84(4):1381–1387 (1991) no month.

Hagstrum et al., Proceedings 6th International Working Conference on Stored–Product Protection, Canberra, Australia, 1994, in press. no month.

Bauwin et al., In: Storage of Cereal Grains and Their Products; 2nd Ed., ed. C.M. Christensen, 115–157, 1974; St. Paul, MN: American Association of Cereal Chemists no month.

Noyes et al., In: Management of Grain, Bulk Commodities, and Bagged Products, Circular E–912, 71–79, Cooperative Extension Service, Oklahoma State University, 1991. no month.

Hagstrum et al., In: Management of Grain, Bulk Commodities, and Bagged Products, Circular E–912, 65–69, Cooperative Extension Service, Oklahoma State University, 1991. no month.

D. E. Hendricks, Environmental Entomology 14(3):199–204 (1985) no month.

D. E. Hendricks, J. Econ. Entomol. 82(2):675–684 (1989) no month.

Greenhouse Product News, pp. 23–24, Jan. 1995.

Agricultural Research Magazine, p. 31, Oct. 1994.

Florida Entomol. Soc., Aug. 1994. Poster presentation and press release by Sean Adams.

Subramanyam et al., J. Econ. Entomol. 83(3):1102–1109 (Jun. 1990).

Subramanyam et al., J. Econ. Entomol. 82(6):1817–1824 (Dec. 1989).

Barak et al., Journal of the Kansas Entomological Society 63(4):466–485 (1990) no month.

Cuperus et al., Journal of the Kansas Entomological Society 63(4):486–489 (1990) no month.

Wei et al., 6th International Working Conference on Stored Product Protection, Canberra, Australia (Apr. 1994).

(List continued on next page.)

*Primary Examiner*—David P. Porta
*Assistant Examiner*—Richard Hanig
*Attorney, Agent, or Firm*—M. Howard Silverstein; John Fado; Gail E. Poulos

[57] ABSTRACT

An automated system has been developed that can acquire and remotely display data indicative of infestation levels in stored agricultural commodities. The system accurately records and time stamps each insect detection, across a full range of pertinent species' sizes, as they drop through a probe containing a sensor head.

11 Claims, 9 Drawing Sheets

OTHER PUBLICATIONS

Shuman et al., Presentation at Annual International Research Conference on Methyl Bromide Alternatives and Emissions Reductions (Nov. 1994) ["Automated Monitoring of Stored–Grain Insects: Acoustical and Electronic Grain Probe Methods"].

Dennis Shuman, Hand–out at ARS/FGIS Working with Non–Gov't People Present (Oct. 25, 1991) ["Electronic Detection of Insects in Grains"].

Subramanyam et al., J. Agric. Entomol 8(1): 9–21 (Jan. 1989).

Trece Incorporated, Storgard WB Probe II Insect Monitoring System, 1 page. no date.

AgriSense–BCS Ltd., Trappit Insect Probe Trap, Technical Information, 1 page. no date.

ELECTRONIC GRAIN PROBE INSECT COUNTER (EGPIC)

BACKGROUND OF THE INVENTION

1. Field of the Invention

This invention relates to an apparatus and a process for monitoring and/or providing a quantitative indication of insect infestations in stored products.

2. Description of the Prior Art

Protection of stored agricultural commodities from insect infestations and the direct loss caused by insects are costly. Insect infestations in stored agricultural commodities result in annual losses of millions of dollars. Early detection of infestation problems is necessary to initiate timely control measures and eliminate unnecessary "scheduled" insect treatments. Routine use of insecticides to protect stored products have many constraints.

The standard practice for detecting and quantifying infestation in stored grain is visual inspection of samples for adult insects. Insects are usually separated from grain samples with hand or inclined sieves. A traditional method of obtaining samples uses a long, hollow, multi-compartment grain trier inserted into the commodity. Its gates are then opened and closed to acquire samples at different depths and, after withdrawal, the samples are removed for inspection (Bauwin et at., In: Storage of Cereal Grains and Their Products; 2nd Ed., ed. C. M. Christensen, 115–157, 1974; St. Paul, Minn.: American Association of Cereal Chemists). Other methods can get beyond the limitation of only sampling close to the grain's surface. A vacuum probe can extract larger samples from deeper with a grain mass and a grain mass can be "turned" enabling a pelican sampler to catch samples from the moving grain stream (Noyes et at., In: Management of Grain, Bulk Commodities, and Bagged Products, Circular E-912, 71–79, Cooperative Extension Service, Oklahoma State University, 1991). None of these sampling techniques provide continuous and thorough monitoring. Low insect populations are difficult to detect in small samples and a much greater proportion of the grain needs to be sampled to accurately estimate insect population size (Hagstrum et at., In: Management of Grain, Bulk Commodities, and Bagged Products, Circular E-912, 65–69, Cooperative Extension Service, Oklahoma State University, 1991). Additionally, these sampling methods are expensive and labor intensive and therefore not repeated very often even though an infestation can grow from undetectable to damaging levels in two weeks. Another method, employed in some large grain elevators, is temperature sensing with thermocouple cables distributed throughout the storage volume. This system is only sensitive to very high insect populations. Furthermore, both moisture and mold growth can elevate temperature levels.

White et at. (Journal of the Kansas Entomological Society, Volume 63(4):506–525, 1990) and Reed et al. (Journal of Economic Entomology, Volume 84(4):1381–1387, 1991) both disclose passive grain probe traps that have been developed to address some of the shortcomings of the above methods. The probes are vertical perforated tubes that insects crawl into and then drop through to be trapped in a reservoir at the lower end. Probes are left in the grain for prolonged periods, allowing them to continuously capture insects and thus detect very low insect populations. However, the information is only available after the labor intensive process of inserting the trap into the grain, waiting, withdrawing the trap, and then inspecting the trap contents. The difficulty of insertion and withdrawal increases with the distance from the surface due to the resistance of the grain.

U.S. Patent No. 5,005,416 discloses an automated, continuous monitoring electronic grain probe trap with a bottom reservoir fitted with a detector that senses the movements of trapped insects. The number of insects caught in the trap is estimated based on the mount of vibration detected. However, temperature, species, time in the trap, the mount of food and other insects in the trap are all factors which can affect the trapped insects' vibration producing activity. Vibration detection may also be prone to error from ambient noise.

Hagstrum et at. (Proceedings 6th International Working Conference on Stored-Product Protection, Canberra, Australia, Volume I, pages 403–505, 1994) disclose a computer-based acoustic system that provides for automated monitoring by detecting insect generated sounds. Piezoelectric transducers, mounted on vertical cables installed in grain bins, sense the feeding and movement sounds of nearby insects. The acoustic sensor outputs are sequentially connected to electronic components that count and relay to a computer, the number of signal peaks crossing a threshold level during each sensor's observation interval.

While various systems for monitoring insect infestation of various stored agricultural commodities have been developed, there remains a need in the art for monitoring systems which provide automated realtime monitoring of insects. The present invention provides such an automated system which is different from prior art systems and solves some of the problems associated with prior art systems.

SUMMARY OF THE INVENTION

It is therefore, an object of the present invention to provide a system for quantitative detection of insect infestations in stored products such as gains, fruits, nuts, vegetables, and legumes, for example.

Another object of the present invention is to provide a system that includes a means for counting insects including a probe and a sensor head.

A still further object of the present invention is to provide a system that includes a means for detecting insects passing through a sensor head located in a probe and a means for analyzing signals produced by a means for detecting insects passing through a probe with a sensor head.

A further object of the present invention is a method for quantifying insects infesting stored products such as grains, fruits, nuts, vegetables, and legumes, for example.

A still further object of the present invention is to provide a method for quantifying insects that includes inserting a probe with a sensor head into a grain storage bin and analyzing signals produced by an insect falling through the sensor head.

Further objects and advantages of the invention will become apparent from the following description

DETAILED DESCRIPTION OF THE INVENTION

The present invention is useful for providing a quantitative detection of insect infestations in stored products such as grains, fruits, nuts, vegetables, and legumes, for example.

Enhancement of a commercial grain probe trap by electronically counting insects falling through it, eliminates (a) the labor intensive process involved in its use, (b) the limitations on where it can be located in a storage structure, and (c) the lack of information available from it until removed from the stored commodity and inspected. The probes 12 of the present invention can be left in commodities for extended periods by providing means for insects to exit them, thus functioning as counters and not as traps.

Figure 1:
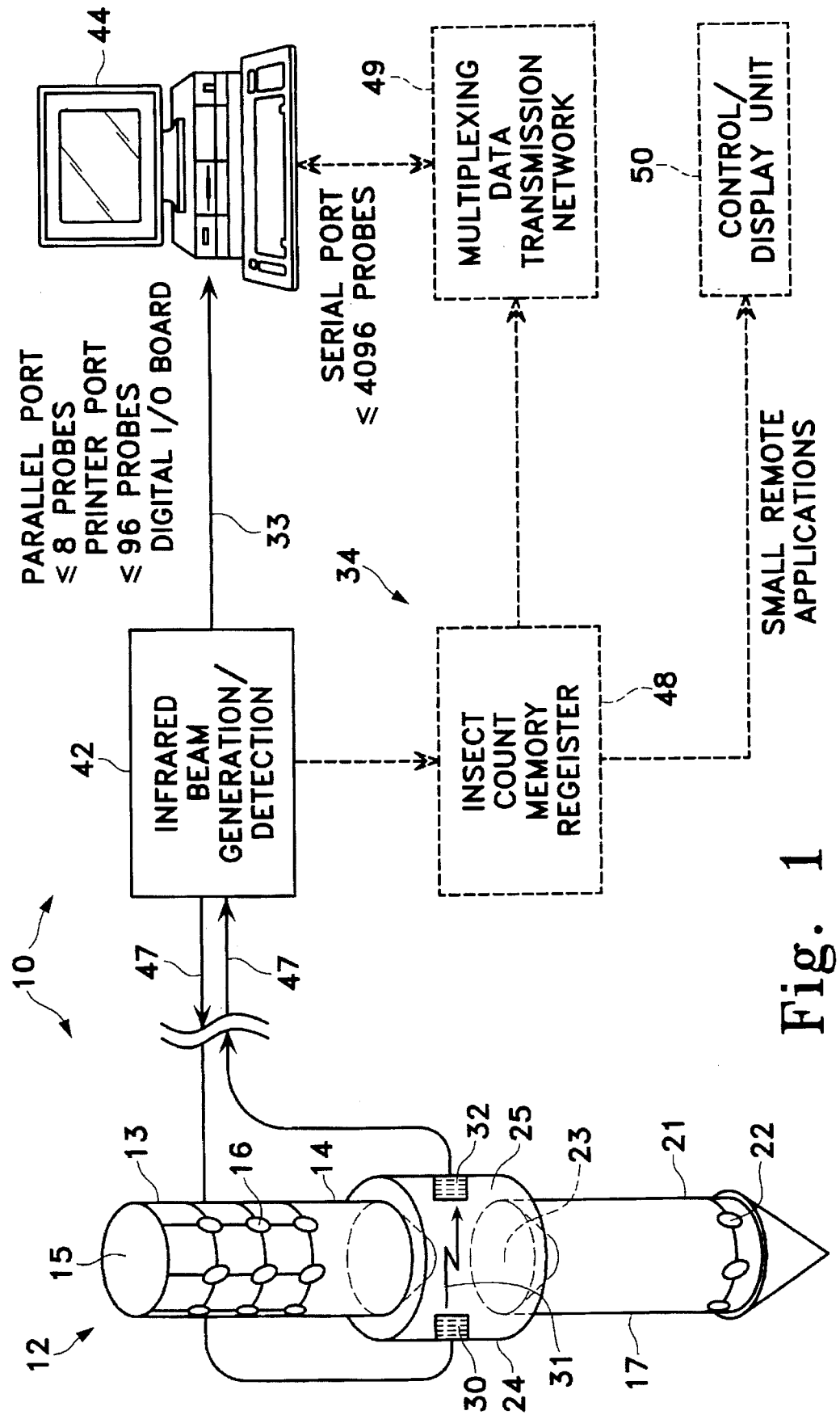
FIG. 1 shows the Electronic Grain Probe Insect Counter system (EGPIC) 10 and system configuration options block diagram.
Figure 6:
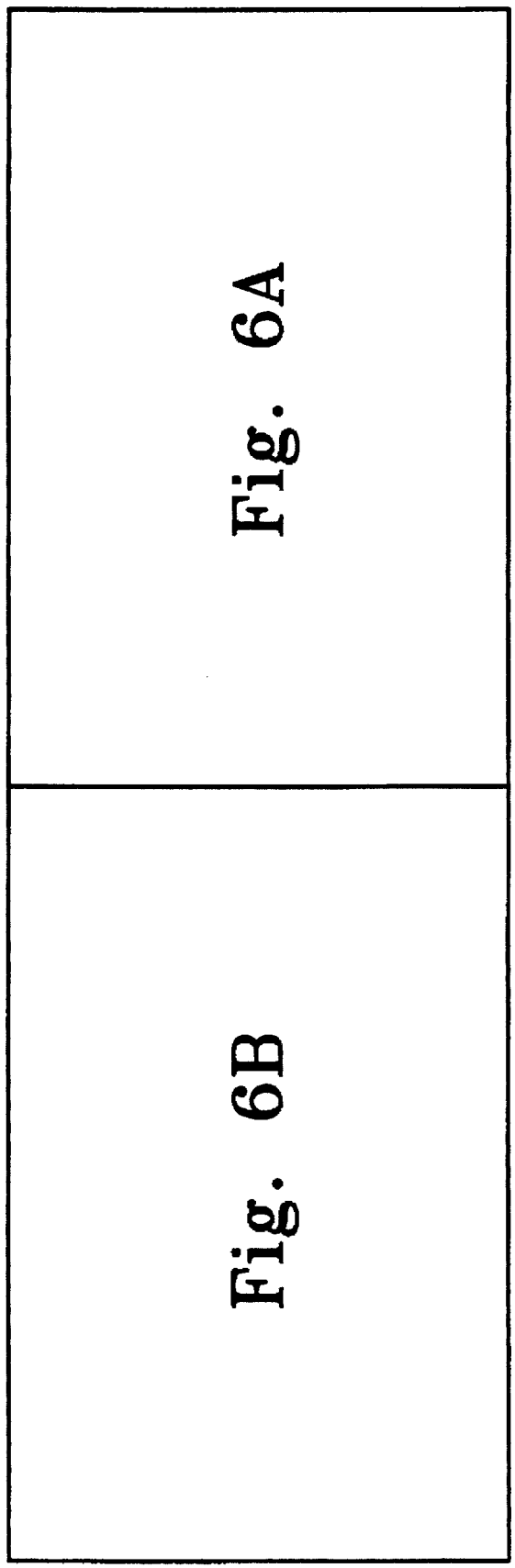
FIGS. 6A and 6B together are a diagram of system 10 circuitry 34.
Figure 6A:
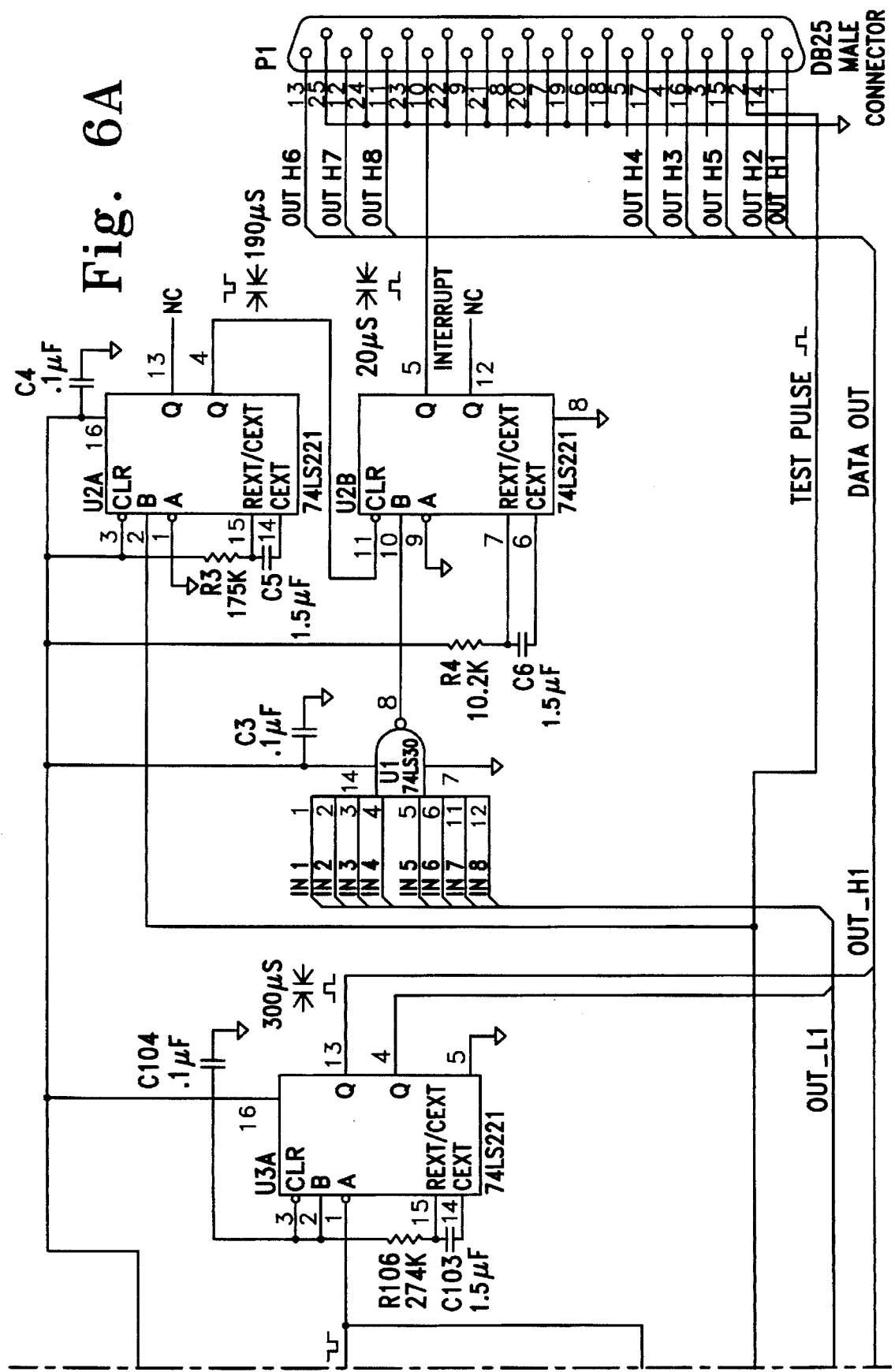
Figure 6B:
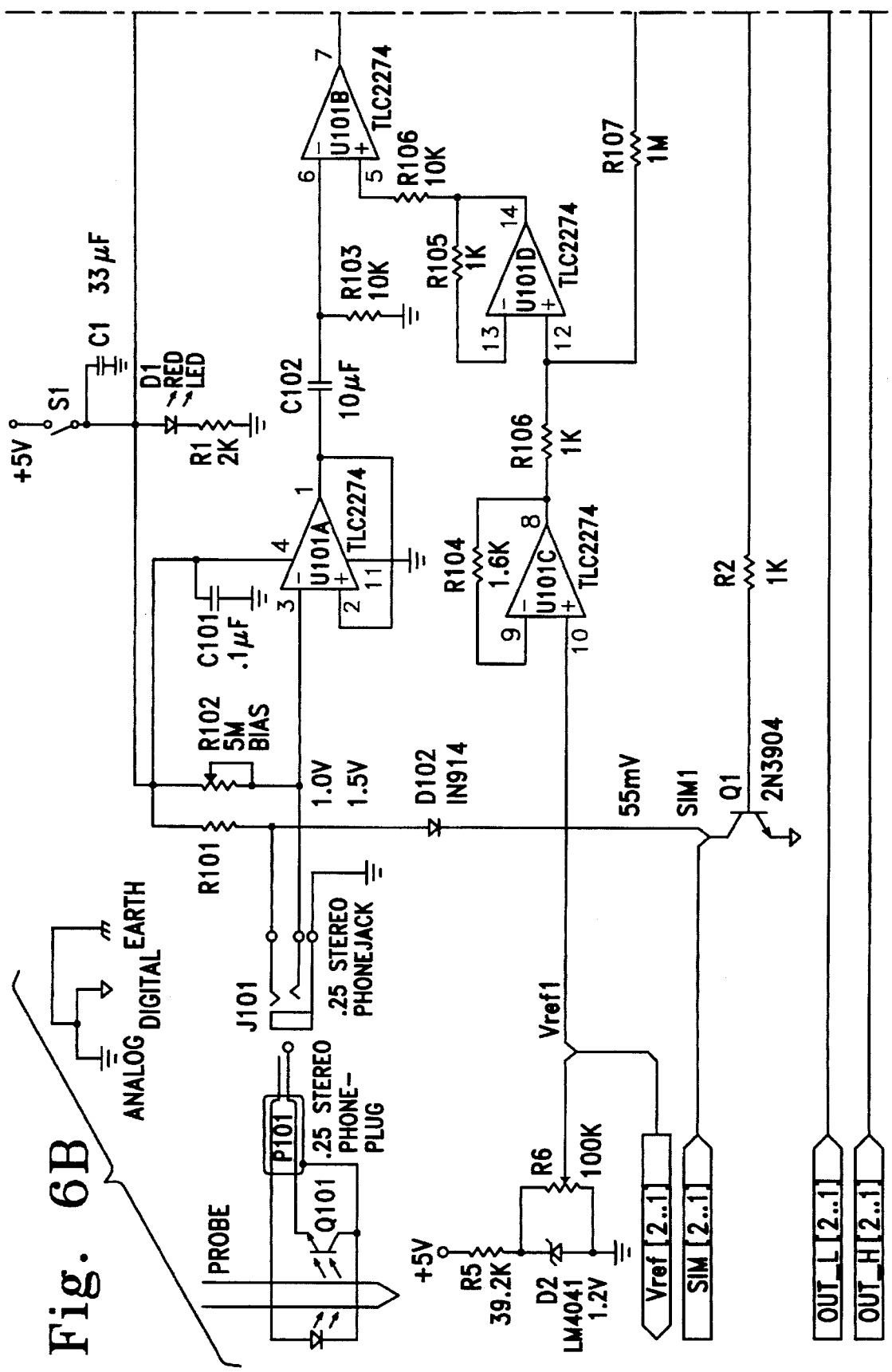

EGPIC 10, an electronic grain probe insect counter (EGPIC), is made up of probes 12, system circuitry 34, data storage, and a user interface (see FIG. 1 and 6). The system provides automated realtime monitoring of insects using modified grain probe traps 12. In pest management, generally, traps can be very sensitive to low insect densities because they monitor continuously and can be enhanced with chemical attractants. However, traps must be periodically inspected, which is labor intensive, limits the temporal availability of data, and restricts placement to easily accessible locations. EGPIC 10 overcomes these limitations by counting insects as they drop through a probe 12, pass through an infrared beam 31, and then exit the probe. Probes 12 can be permanently mounted at any level in a storage structure or moved in and out of a stored product. Electric power and circuitry are kept out of the storage structure because of the danger of grain dust explosions, and only low voltage, high impedance, sensor leads 47 pass through the commodity from the beam generation/detection circuitry to sensor head 24. The analysis of the information received from probes 12 can be performed on (a) a computer with one computer parallel port input line for interfacing with each probe 12, (b) a computer with a commercial digital I/O computer board for applications requiring more than 8 probes, (c) a computer interfaced through the serial port with a multiplexing data transmission network which interfaces with multiple dedicated memory registers (one for each probe) for very large application involving up to 4,096 probes where the computer must be further than 50 m from the probes, or (d) dedicated memory registers with a control/display unit for low end application.

Probes 12 can be modified grain probe traps such as Storgard WB Probe II (Trece Inc., P.O. Box 6278, Salinas, Calif. 93912) which is made from a molded polypropylene tube manufactured as a filtration product (Conwed Plastics, 2810 Weeks Ave SE, Minneapolis, Minn. 55414) or TRAPPIT™ (Agrisense, 4230 West Swift, Suite 106, Fresno, Calif. 93722, Subramanyam et al., J. Agricultural Entomology, Volume 6(1): 9–21, January 1989, which is herein incorporated by reference). The WB Probe II aperatures 16 are simply in line with the thin-walled molded body while TRAPPIT™ has slanted holes in an acrylic body. Tests have shown (Subramanyam et al., supra) that using the probe body like TRAPPIT™ upside down reduces dust and particle entry because of gravity while not effecting insect catch. For EGPIC, the TRAPPIT™ aperatures are useful since the probes are susceptible to dust and particle contamination.

As illustrated in FIG. 1, a probe 12 is provided with upper body section 13 which is an insect permeable trap portion that includes a first wall portion 14 defining a first interior chamber 15 and also defining at least one upper body aperture 16 dimensioned to permit ingress of an insect or insects through at least one aperture 16 and into said chamber 15. First wall portion 14 may be of any suitable reasonably strong and durable material including various metals such as brass or steel or any of the plastic acrylics or polycarbonates such as LEXAN™, Plexiglass, etc., or thermosetting plastic composites used for injection molding. Preferably the first wall portion 14 defines an array of from about 20 to about 100 aperatures 16. While the size and shape of aperatures 16 and 22 are selected to permit ingress of the insect(s) of interest, preferred circular aperture diameters range from about 0.11 inch (2.8 mm) to about 0.150 inch (3.8 mm). The length of upper body section 13 ranges can be from about 15 cm to about 40 cm. However, the length can be modified depending on the volume of grain to be monitored. Lower body section 17 defines an interior surface (not shown) and third interior chamber (not shown). Lower body section 17 has a perforated lower section 21 with at least one aperture 22 which permits insect(s) to exit probe 12 to avoid large accumulations of captured insects. Upper portion 23 of section 17, just below sensor head 24 is unperforated to reduce the probability of insects looping around through the grain and funnel-shaped to reduce the probability of insects crawling back up to the sensor resulting in multiple counts. Lower body section 17 length can range from about 3.9 inches (10 cm) to about 19.5 inches (50 cm). This probe design is modular and allows for a variety of interchangeable upper and lower body sections. For example, when used in a particular commodity, an upper section 13 can be picked with an aperture 16 sized to admit the largest insect species of interest while excluding product kernels. When probe 12 is to be left in place for extended periods, lower section 17 may contain aperatures 22. If insect capture is desired, lower section 17 may be completely enclosed as a collection vessel (not shown). For permanent placement in a grain storage structure, system 10 has a single probe, a long tube which extends from top to bottom of the structure and has multiple regions containing a sensor head 24 with aperatures 16 and 22 above and below sensor head 24. These regions are separated from each other by a barrier so that an insect entering the probe at one region would only be counted by one sensor head before it exits the probe.

Figure 2:
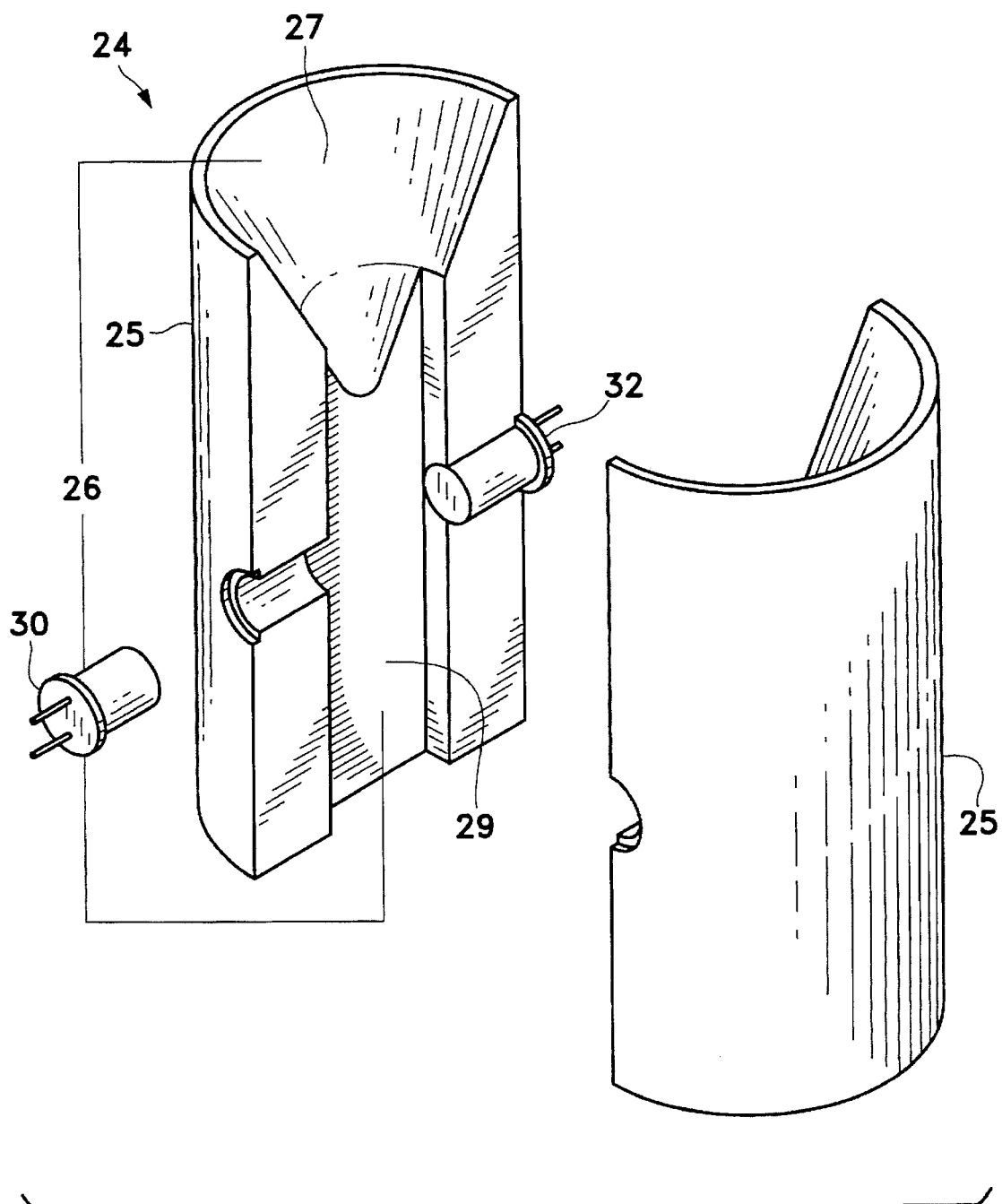
FIG. 2 is a split view of one embodiment of sensor head 24 and its internal design.
Figure 3:
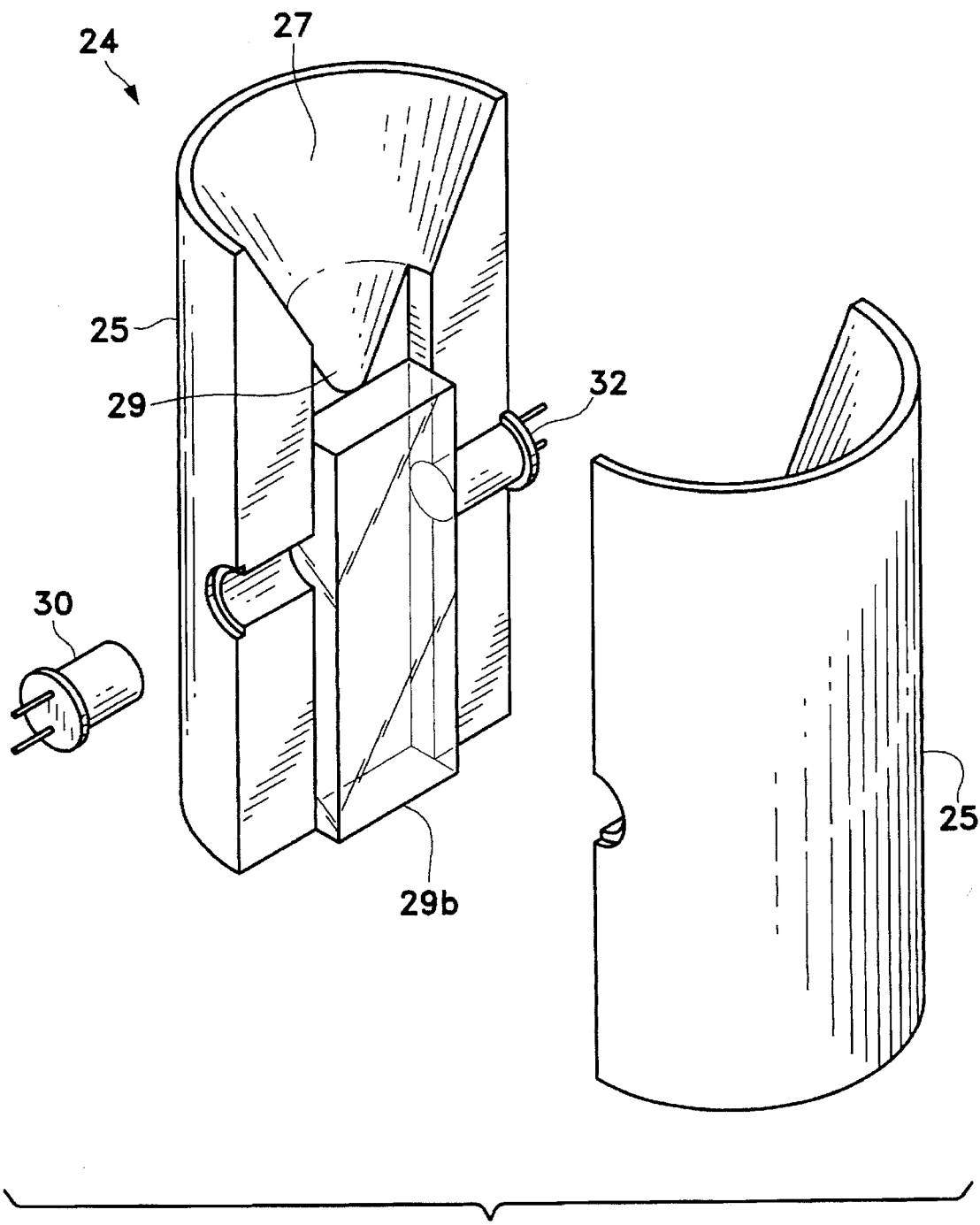
FIG. 3 is a split view of one embodiment of sensor head 24 with transparent insert.

As illustrated in FIGS. 1, 2, and 3, probe 12 is provided with a means 24 for sensing the passage of insects from upper body section 13 to lower body section 17. Means 24 is a sensor head which includes a second wall portion 25 defining therein a second interior chamber 26. Sensor head 24 is fabricated by molding resin and/or by machining PVC stock and may be of any suitable, reasonably strong and durable material including, for example, various metals such as brass or steel, or any of the plastics acrylics or polycarbonates such as LEXAN™, Plexiglass, etc., or thermosetting plastic composites used for injection molding. The inner top section 27 of chamber 26 is funnel-shaped and the lower part is a longitudinally centered inner channel 29 which is approximately 1.8"×0.505"×0.175" (FIG. 2). Located midway on one side of channel 29 is an infrared light-emitting diode (LED) 30 which produces a beam 31 that is sensed by an infrared phototransistor 32 located opposite of LED 31. For the entire system, infrared LEDs' beam 31 strengths in all sensor heads are set by a single adjustment and then the quiescent operating point of each phototransistor 32 is adjusted to optimize performance for the range of insect sizes of interest and to compensate for structural and LED tolerances. Phototransistor 32 is operated with reversed collector and emitter connections to reduce its gain, and thus keep the phototransistor 32 in it's linear region so that it's output signal is proportional to the size of the insect passing through beam 31.

Inner top section 27 and channel 29 are coated with a non-stick material such as TEFLON™ (i.e. polyetrafluorethylene) and fluorinated ethylenepropylene resins to minimize the possibility of insects loitering in the vicinity of beam 31. Initial tests revealed that some insect species could grab onto the edges where sensor element 30 and 32 ends are flush against channel 29 and this causes counting errors. This is corrected by using a transparent acetate insert 29b in channel 29 (See FIG. 3). Insert 29b and channel 29, in which it is positioned, are slightly tapered downward so that insert 29b does not slide out of the bottom of channel 29.

Figure 4A:
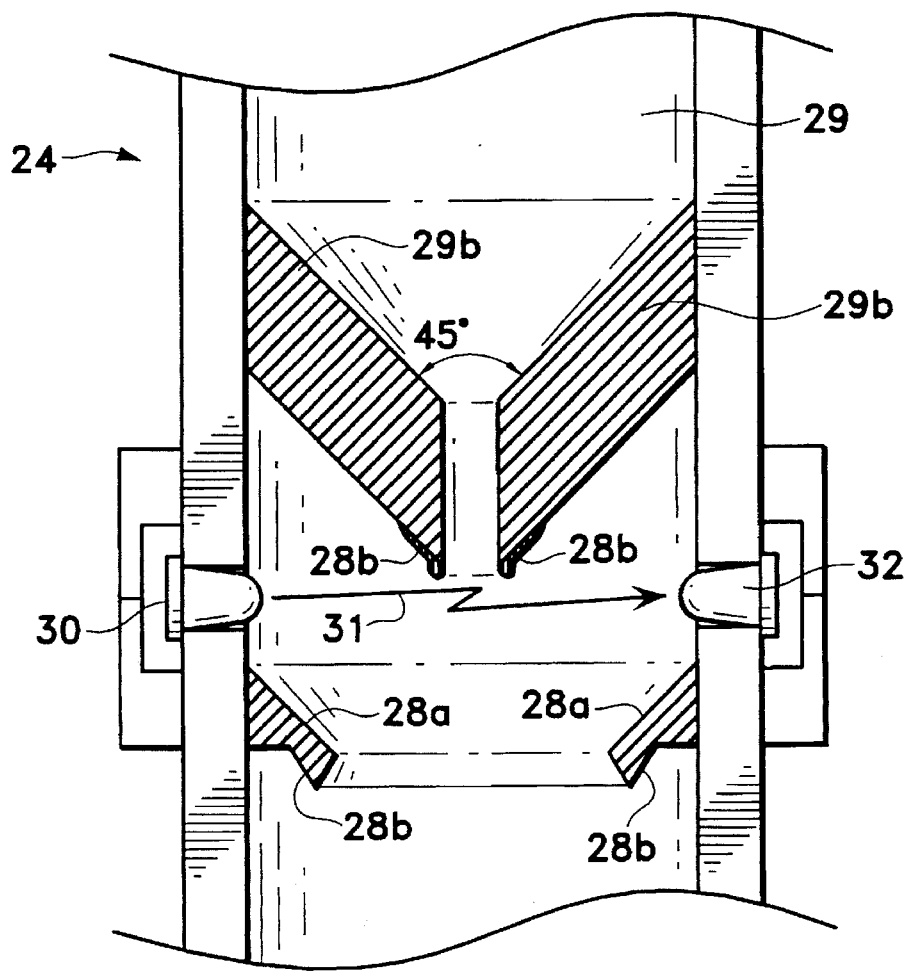
FIG. 4A is a cross-section of one embodiment of sensor head 24.
Figure 4B:
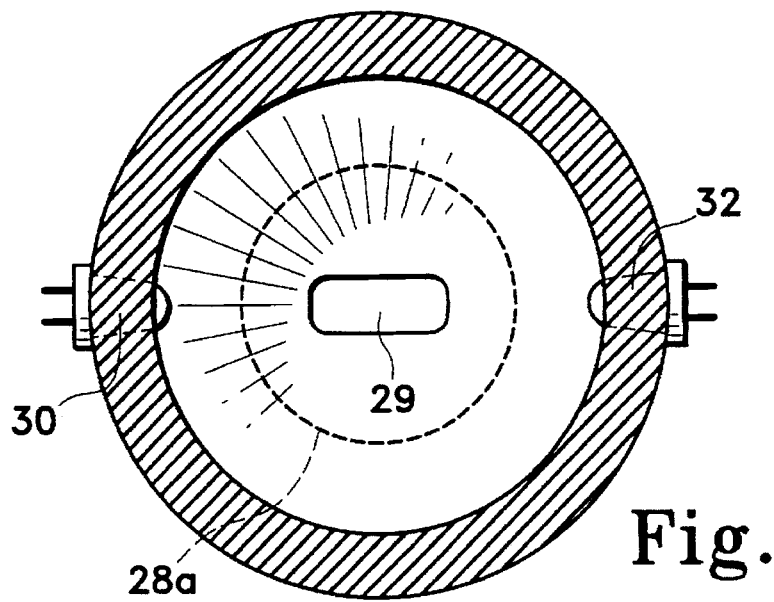
FIG. 4B is a cross-section of sensor head 24 in 4A showing bottom ring 28a and channel 29.

Another embodiment of the sensor head channel 29 is shown in FIGS. 4a and 4b. Transparent insert 29b in channel 29, above, can get covered with dust over time which degrades insect counting performance. Therefore, for probes 12 which will remain in storage bins over a long time period, channel 29 has sensor elements 30 and 32 recessed from the path of dropping insects and dust (FIGS. 4a and 4b). In addition, a 45° angled funnel-shaped insert 28 with downwardly projecting lip 28b is located just above phototransistor 32 and LED 30 and a bottom ring 28a with downward projecting lip 28b is located just below phototransistor 32 and LED 30. Insert 28 directs insects through beam 31 and both bottom ring 28A and insert 28 prevents insects from crawling from the bottom or top of the head to the sensor elements 30 and 32. Regard for surface smoothness, elimination of footholds, a Teflon coating applied on inner channel 29, and a funnel-shaped upper portion 27 of lower body section 17 and a funnel-shaped insert 28 with downward projecting lips and a bottom ring 28a in sensor head 24 minimize the possibility of insects loitering in the vicinity of beam 31.

Figure 5:
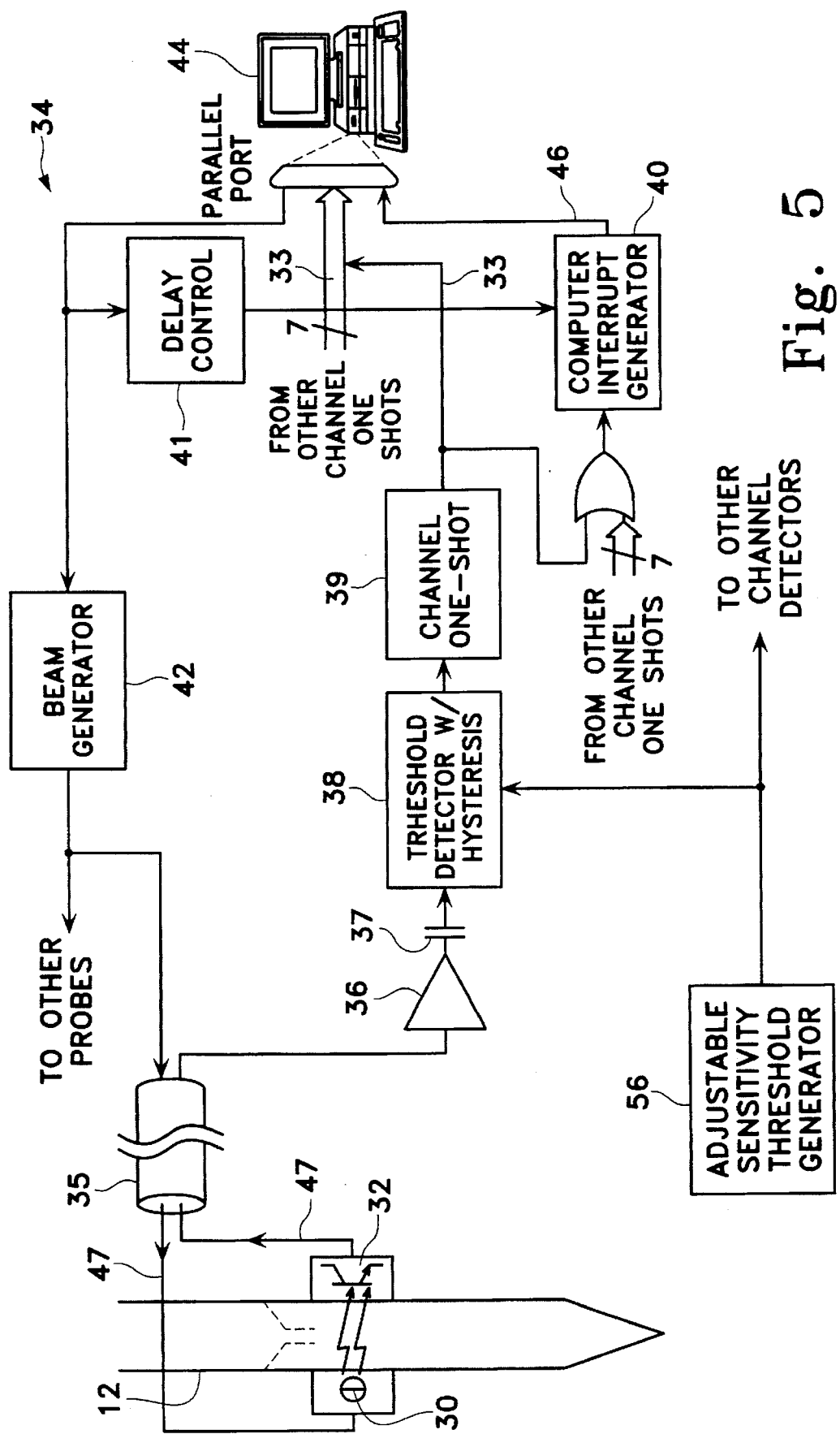
FIG. 5 is a block diagram of one probe channel and its functional components for parallel-input implementation.

The detecting means, an infrared beam generation/ detection and computer interface circuitry (shown in FIG. 1, FIG. 5, and FIG. 6), is responsible for generating (a) an appropriate signal to notify a computer when any sensor head output change is detected and (b) another signal sent to line 33 dedicated to each individual sensor head 24 so that computer 44 can then determine through which sensor head 24 an insect dropped. Circuitry 34 includes shielded cable 35; a detecting means including buffer 36, AC coupling 37, threshold detector with hysteresis 38, a beam generator 42, and an adjustable sensitivity threshold generator 56; and an interfacing means which includes a channel one-shot 39, delay control 41, and computer interrupt generator 40. The output of each phototransistor 32 is buffered and AC coupled (FIG. 5) to allow its threshold detector 38 to respond to phototransistor's 32 small signal transients created by falling insects slightly masking beam 31. Circuitry 34 employs hysteresis (FIG. 5) for noise immunity during signal threshold crossings. A common adjustable threshold level permits setting the sensitivity to limit the minimum detectable insect size, which also helps reduce grain particle errors. An insect produced detector output triggers its one-shot 39 to generate a standardized 300 μs channel pulse that is applied to a digital input line on computer 44 printer parallel port 45 or on an installed digital I/O computer board (not shown) and to a common interrupt generator 40. The triggered interrupt generator 40 applies a 20 μs pulse to computer 44's interrupt line 46. This alerts the computer to scan all the channels' digital input lines 33 (within 300 μs of the detector output) to ascertain and record which probe(s) had the falling insect.

At scheduled times (explained below), computer 44 initiates a check of the entire system's operability by simulating a falling insect via a momentary reduction of beam generator 42's output applied to all probes. The first channel (probe 12 with the shortest sensor cable) to respond initiates an interrupt causing all the channels' digital input lines 33 to be checked for proper response. However, since the time delay from the reaction of beam generator 42's output to a channel's pulse response is about 4 μs per meter of sensor cable, during a system self-check an interrupt delay of 190 μs is enabled to ensure receiving responses from probes with the longest sensor cables before computer 44 checks the channels' digital input lines EGPIC's computer 44 functions are supervisory as well as for data acquisition, storage, data analyses, and presentation. The EGPIC software, written in Borland C++ controls system operation, manages the acquired data, and provides a user-friendly interface. A main menu provides access to features of software and information about its ability to automatically recover from a power failure. A configuration menu provides user options for the insect monitoring (data acquisition) mode. Acquired data, which include system operating events as well as insect counts, are temporarily stored in memory (high speed RAM) to insure not missing insect counts. Backing up these data to a file on the hard drive takes the acquisition system off-line for a short time (computer hardware dependent), so the user can choose how often it is done. The system can be set to automatically backup the hard drive file to an archive floppy disk drive at the end of data acquisition. Data acquisition automatically ends after a user selected time interval or by manual user control. The retrigger threshold allows the user to specify the minimum time interval between channel pulses, for each probe, that will be recorded as separate insect counts. This feature protects against multiple counts from a single insect that is slow in clearing the infrared beam. Audible beeps can alert the user to incoming insect counts. The parallel port information tells computer 44 to which port the EGPIC 10 hardware is connected and what Interrupt Request Level (IRQ) level to use. EGPIC 10 is designed to run on most IBM-type PC (286 or higher) computers and the benchmark test checks a computer for adequate performance parameters. While scheduled backups prevent total loss of insect data in case of a power failure, failure recovery additionally enables EGPIC 10 to automatically resume insect monitoring when power resumes and provides a complete report of the power failure and its effect on the filed data.

Figure 7:
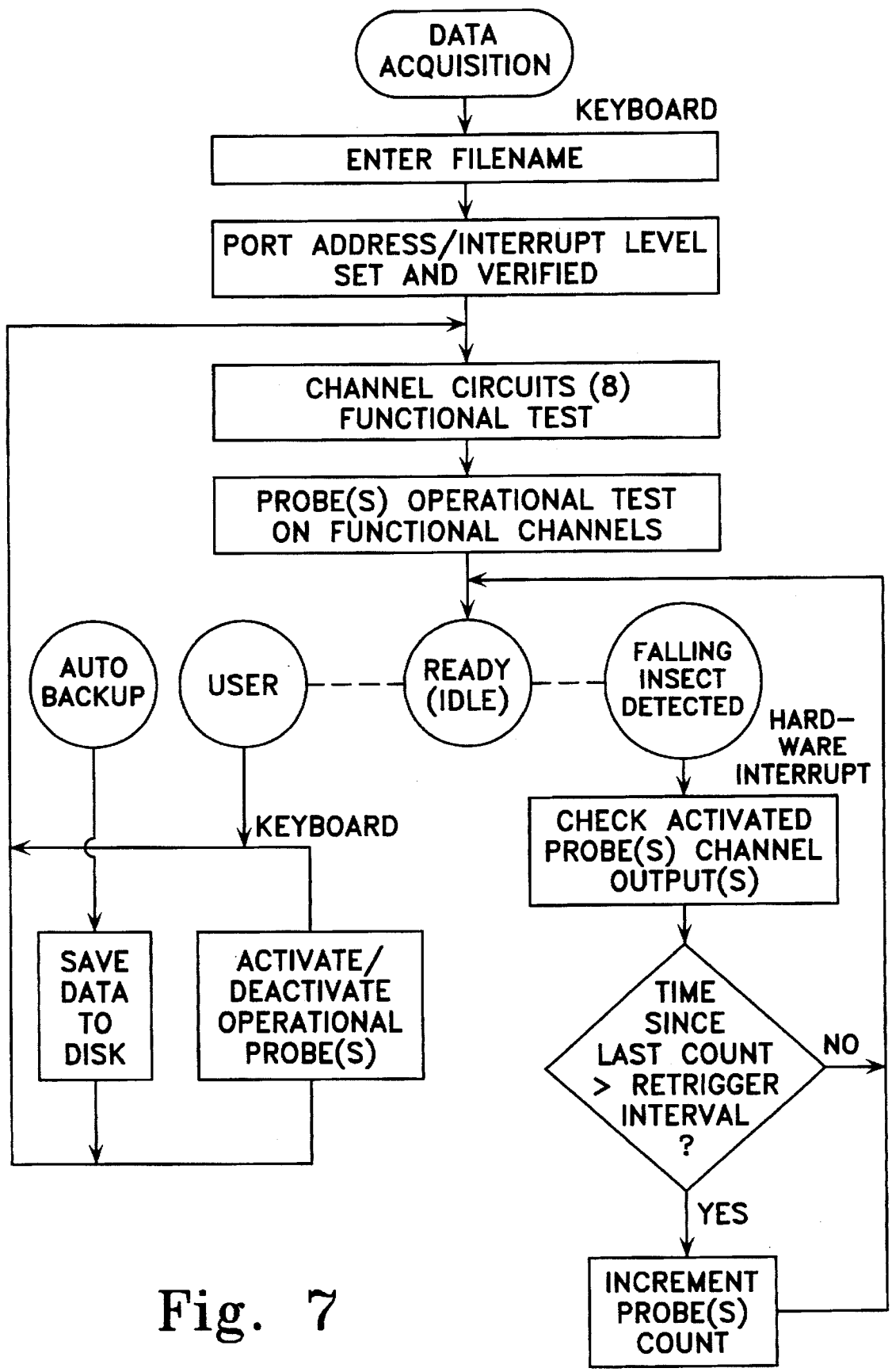
FIG. 7 is a simplified data acquisition software flow chart.

A data acquisition screen gives complete probe status and usage information, and provides the user with control of the system. A help screen provides comprehensive instructions for operating the system. Upon selecting the acquisition mode, the user is prompted for a data filename and the system initializes and tests itself (FIG. 7). The status result of testing of each channel is either (a) unavailable—channel circuitry not installed, (b) non-operational/idle—channel circuitry installed but probe not connected or not working, or (e) operational/idle—ready for use. Monitoring of insects counts for individual operational probes begins when they are activated by the user, which also starts their elapsed active time clock and initiates a system self-check. If such an operational/active probe or channel malfunctions during acquisition (as determined by a system self-check), the status becomes a flashing non-operational/active to alert the user. Since the data acquisition function is interrupt driven, the computer is idle (taking care of clocks, other overhead functions, and potentially available for other chores) until a falling insect causes an interrupt. The interrupt driven design (as opposed to a polling design) also allows the computer to respond immediately to a falling insect so that a quick succession of probe counts can be acquired without error. If the interrupt service routine finds a probe channel pulse and the retrigger interval criterion has been met, then that probe's (insect) count is incremented and its time since last count clock is reset. Other system controls initiate a manual system self-check, a data save to the hard drive (which is always accompanied by a system self-check), and a manual termination of the data acquisition function (which is accompanied by a system self-check and a data save to the hard drive). The user is provided with the convenience of separate annotation pages for recording notes about each probe during data acquisition, a computer screen blanker which does not interfere with data acquisition, and a troubleshooting display for monitoring several system operational parameters.

The data manager allows the user to view, export to a spreadsheet, or print the acquired data in many formats. These include different data summaries, ordering criteria, and selections of details. The insect counts recorded for each probe are numbered and time-stamped. Also, any retriggers caused by less than the minimum time interval between channel pulses are shown.

A computer can be used with one or more digital I/O (DIO) boards for applications of 96 probes or more. However, a PC printer parallel port, like a dedicated DIO card, offers digital output lines and interrupt-on-input capability. Software can be used to create a 100 percent compatible PC parallel port with up to 8 bits of digital input. A rudimentary set of C functions allows for reading and writing to the parallel port and installing an interrupt-service routing (ISR) to handle incoming data on the parallel port. Listing One is PPDIO.H; Listing Two is PPDIO.C.

The parallel port is programmed via three separate I/O registers; the input-only data register, the output-only status register, and the input/output control register. The data register, located at the parallel port's base address, takes a standard bit mask that indicates which pins should be sent high and low. Sending information out the parallel port is accomplished with a simple OUT instruction. PPDIO_SendByte( ) handles this. The parallel port transmits this byte until told to transmit a different one. Note that while the data register can be theoretically read with an IN instruction, the byte read won't be incoming data—it will be the most recent data transmitted. The data register can not be used for input, so both the status and control registers are used. Reading the status register is very straightforward, except that the logic of pin 11 is inverted. The control register is nominally an output-only register, but by taking advantage of the four output lines driven with open-collector drivers, the control register can be forced into giving input. If a high TTL logic level is produced at the control register's corresponding pins, the pins can be driven low via the incoming signals. Thus, by setting the appropriate bits of the control register, the pins can be used as input. This is handled transparently when PPDIO_InstallISR( ) is called. Reading the control and status registers is accomplished by an IN instruction at the port's base address and relevant offset. The routines PPDIO—ReadStatusRaw( ) and PPDIO_ReadControlRaw( ) illustrate how to accomplish this. Because several of the input lines have negative active logic placed upon them by the parallel port, helper functions that translate negative logic would be useful. The routines PPDIO_ReadStatusCooked( ) and PPDIO_ReadControlCooked( ) provide this functionality, along with converting reserved and unused bits to 0.

Once input and output are addressed, the communications is made to be interrupt-driven. The parallel port's input lines could be polled; however, this would be cumbersome, time consuming, and error-prone. Interrupt-driven input on the parallel port is achieved by first having the interrupt enable bit set in the control register. Next, an ISR must be installed in the DOS interrupt vector table for the appropriate IRQ. Finally, the port's IRQ must be unmasked from the 8259 Programmable Interrupt Controller's interrupt-enable register. All of this is demonstrated in PPDIO_InstallISR( ).

EGPIC uses a simple call-and-acknowledgement method of IRQ determination to solve the problem of detecting which IRQ a given base address or LPT port corresponds to. This involves installing ISRs at IRQs 5 and 7, "calling" the EGPIC hardware (which acknowledges the call by generating an interrupt), then seeing which ISR is called. If no ISR is called, either another IRQ is in use or no IRQs are being used for the parallel port. A secondary use of this call-and-response procedure is for hardware testing—if a probe is known to be installed and fails to generate a response when requested, then that probe must be malfunctioning. Interrupts are generated via pin 10, normally a printer's ACK line. A high-line level sent to pin 10 results in an interrupt being generated, assuming that all other relevant setup has been done.

During the development of EGPIC, it was found that both cable length (from probe to computer) and interrupt latency plays a role in determining whether a signal actually exists at inputs when the ISR is called. With long cable lengths and a fast computer, it was possible for some inputs not to be updated by the time the ISR was executed. Conversely, with a slow computer it was possible for the signal to have come and gone (depending on the length of the generated input) by the time the ISR was called. These timing problems are compensated for in hardware by the interrupt delay control 41 and a long enough channel one shot 39 pulse, respectively.

For large scale applications using up to 4,096 probes or where a computer must be further than 50M from the probes, a computer's serial port is used in conjunction with a multiplexing data transmission network 49 which efficiently transfers digital data from thousands of sensors along one line to the serial port of a central computer using a distributed multiplexing tree network (FIG. 1). Each probe's output signal is locally processed, digitized, and continuously accumulated in its own dedicated memory register 48 adjacent to the beam generation/detection circuits so that the sensor's output is always monitored. The contents of each register 48 is transmitted by the network to the computer at regular intervals whose minimum duration is inversely proportional to the number of sensors.

For low end applications, such as a small farm bin, a freestanding AC or battery powered dedicated control/display unit 50 can provide the most economical count display (FIG. 1). The control/display unit 50 has an LED or LCD device to display counts, beam generation/detection circuits, memory registers, a power interrupt indicator, and system test and reset controls.

EGPIC 10 was tested in laboratory tests with probes 12 inserted in infested wheat and corn. Six pertinent beetle species ranging in size from *Cryptolestes ferrugineous* to *Tribolium castaneum* in different densities were used. EGPIC counting accuracy was >95% with the main sources of error being grain particles and insects dumped together.

In field tests of EGPIC 10 conducted in a flat storage of corn, EGPIC overestimated the actual number of insects passing through the probes. Grain particles and dust that passed by the sensors, and the movement of minute insects and mites back and forth over the sensors, contributed to increased counts. Additionally, beam paths became obscured with accumulated dust as sampling time progressed. Nevertheless, regression analysis revealed that EGPIC counts could reliably predict ($R^2$=0.897) numbers of insects entering probes across a range of insect densities.

The foregoing detailed description is for the purpose of illustration. Such detail is solely for that purpose and those skilled in the art can make variations without departing from the spirit and scope of the invention.

INDEX OF ELEMENTS DESIGNATED BY NUMERAL

10 Electronic grain probe insect counter
12 Probes
13 Upper body section
14 First wall portion
15 First interior chamber
16 Upper body aperture
17 Lower body section
21 Perforated lower section
22 Aperture
23 Upper portion
24 Sensor head
25 Second wall portion
26 Second interior chamber
27 Inner top section
28 Funnel-shaped insert
28a Bottom Ring
28b Downward projecting lips
29 Longitudinally centered inner channel
29b Insert
30 Infrared light-emitting diode (LED)
31 Infrared beam
32 Phototransistor
33 Line
34 Circuitry
35 Shielded cable
36 Buffer
37 AC coupling
38 Threshold detector with hysteria
39 Channel one-shot
40 Interrupt generator
41 Delay control of interrupt generator
42 Beam generator
44 Computer
45 Printer parallel port
46 Interrupt line
47 Sensor leads
48 Memory register
49 Multiplexing data transmission network
50 Control/display unit
56 Adjustable sensitivity threshold generator

We claim:

1. A system for quantitative detection of insect infestations in stored products comprising at least one probe having an upper body section containing at least one aperture to permit ingress of insects, a lower body section and a sensor head located between and operatively connected to said upper and lower body sections wherein said sensor head comprises an infrared phototransistor and an infrared light-emitting diode;

a detecting means for notifying a computer when any sensor head output change is detected and for reading a signal from each sensor head so that the computer can determine through which sensor an insect has dropped; and an analyzing means connected to said detecting means for receiving and analyzing signals from said detecting means.

2. The system of claim 1 wherein said lower body section is perforated.

3. The system of claim 1 wherein said lower body section is completely enclosed.

4. The system of claim 1 wherein an interior channel of said sensor head is coated with a non-stick material.

5. The system of claim 1 wherein said detecting means comprises a plurality of buffers for each of said plurality of counting means, a plurality of threshold detectors with hysteresis for each of said plurality of counting means, a beam generator for all of said plurality of counting means, and an adjustable sensitivity threshold generator for all of said plurality of counting means.

6. The system of claim 1 wherein said analyzing means is selected from the group consisting of a computer with one computer parallel port input line interfacing with each of said plurality of counting means through said computer's parallel port; a computer with one digital I/O board input line interfacing with each of said plurality of counting means; a computer interfacing with a multiplexing data transmission network, through said computer's serial port, wherein said network interfaces with a plurality of dedicated memory registers wherein each of said registers interfaces with each of said plurality of probes; and a memory register interfaced with a readout.

7. A method for quantifying insects in stored products comprising placing at least one probe having an upper body section containing at least one aperture to permit ingress of insects, a lower body section and a sensor head located between and operatively connected to said upper and lower body sections wherein said sensor head comprises an infrared phototransistor and an infrared light-emitting diode into a stored product;

detecting the passage of at least one insect through the probe using a detecting means attached to said at least one probe for notifying a computer when any sensor head output change is detected and for reading a signal from each sensor head so that the computer can determine through which sensor an insect has dropped; and receiving and analyzing data from said detecting means using an analyzing means connected to said detecting means through a means for interfacing the detecting and analyzing means.

8. A one probe for detection of insect infestations in stored products comprising an upper body section containing at least one aperture to permit ingress of insects, a lower body section, and a sensor head located between and operatively connected to said upper and lower body sections wherein said sensor head comprises an infrared phototransistor and an infrared light-emitting diode.

9. The probe of claim 8 wherein said lower body section has at least one aperture to permit the egress of insects.

10. The probe of claim 8 wherein said lower body section is completely enclosed.

11. The probe of claim 8 wherein an interior channel in said sensor head is coated with a non-stick material.

* * * * *